No. 730,834.      Patented June 9, 1903.

UNITED STATES PATENT OFFICE.

STEPHEN L. MERSHON, OF MONTCLAIR, NEW JERSEY.

REFRACTORY ARTICLE OF MANUFACTURE.

SPECIFICATION forming part of Letters Patent No. 730,834, dated June 9, 1903.

Application filed August 29, 1902. Serial No. 121,539. (No model.)

*To all whom it may concern:*

Be it known that I, STEPHEN L. MERSHON, a citizen of the United States, residing at Montclair, county of Essex, and State of New Jersey, have invented a new and useful Improvement in Refractory Articles of Manufacture, of which the following is a specification.

My present invention pertains to articles of manufacture of various shapes and sizes intended to withstand processes of heating to extremely high temperatures and subsequent cooling without disintegrating, deteriorating, or cracking, and, further, relates to articles of the above description which have the property of absorbing phosphorus from molten metals.

Some of the objects of my invention are to provide variously-conformed articles—such as fire-bricks, furnace-linings, and crucibles—of material capable of absorbing phosphorus from molten metal and heat-withstanding building elements which possess the requisite qualities permitting of their being raised to extremely high temperatures and cooled without fracture and which are susceptible of receiving a high polish and ornamental surface treatment. These and other objects I accomplish by carving, abrading, or otherwise fashioning the desired article—fire-brick, building-block, crucible, &c.—from a natural fibrous, foliated, or interlocked structure of a silicate in the mass as distinguished from crushing the stock and forming by pressure, mold, or otherwise and vitrifying the same by a succession of graduated temperatures from low to high.

I prefer to fashion the desired article from a silicate of magnesia, which occurs in nature in various structures, but that most serviceable for the present purpose being the mineral known as "talc."

It has not before within my knowledge as a fire-brick and crucible expert and manufacturer been known or thought possible that a crucible could be made wholly of silicate of magnesia, as no tenacity could be imparted to the material to resist the extreme heating and cooling to which such a vessel is necessarily subjected; but silicate of magnesia has the peculiar property of absorbing phosphorus from molten steel, thus enabling good steel to be made from high phosphorus ores, and therefore I have aimed to produce such an article therefrom. I have attained this article with a greater degree of tenacity and hardness than the black-lead crucible material now universally used and in a form which is affected in much less degree by the action of the metals and the gases, and which is therefore longer-lived than the black-lead article.

Silicate of magnesia occurs as soapstone, talc, asbestos, &c.; but talc is the preferable stock for the present purposes, and especially that form of talc which exhibits a fibrous or foliated structure or that in which myriad bundles of laminæ are intimately interlocked with the laminæ of the several bundles assuming different planes and found in large quantities in St. Lawrence county, New York, and in lesser quantities at other points. I prefer to employ in my article that form of talc found near Gouveneur, St. Lawrence county, New York, as possessing the required qualifications.

Silicate of magnesia in the form of fibrous or foliated talc, referred to above, is comparatively soft and lends itself readily to the carving or abrading process in fashioning an article from the massive rock. After vitrification by the slow application of graduated heats the said fibrous or foliated talc is found to be a hard granite-like substance which is not susceptible to deterioration or fracture by subsequent heating to very high temperatures and cooling and apparently acquires the quality of resisting fracture in the heating and cooling processes from the natural intimately-interlocked condition of the fibrous or foliated structure of the original stock.

It may be preferable in some cases to vitrify the talc and subsequently fashion by carving, abrading, or otherwise from the block the article desired, and such course will of necessity be governed by the exigencies of the particular case.

When a building-block of this character is produced and a high polish is imparted thereto, it may be heated to a white heat and cooled without fracture and without apparently affecting the polish thereon.

I do not desire to limit the scope of Letters Patent which may issue upon this application by limiting myself to the employment of silicate of magnesia in the production of my improved article; but I desire to produce the same from any refractory silicate which before vitrification may exist in mass in a fibrous or interlocked foliated structure.

What I claim is—

1. A refractory article of manufacture of a vitrified natural-mass fibrous, foliated or interlocked foliated or fibrous silicate.

2. A refractory article of manufacture of a carved or abraded natural-mass and vitrified fibrous, foliated or interlocked foliated or fibrous silicate.

3. A refractory article of manufacture of vitrified natural-mass fibrous, foliated or interlocked foliated or fibrous silicate of magnesia.

4. A refractory article of manufacture of carved or abraded natural-mass and vitrified fibrous, foliated or interlocked foliated or fibrous silicate of magnesia.

5. A fire-brick of a vitrified natural-mass fibrous, foliated or interlocked foliated or fibrous silicate.

6. A refractory article of manufacture of a vitrified polished natural-mass fibrous, foliated or interlocked foliated or fibrous silicate.

7. A refractory article of manufacture produced by the application of a succession of graduated rising temperatures to a natural mass of a silicate.

8. A refractory article of manufacture produced by the application of a succession of graduated rising temperatures to a natural mass of silicate of magnesia.

9. A refractory article of manufacture produced by the application of a succession of graduated rising temperatures to a natural mass of talc.

10. A refractory article of manufacture produced by the application of a succession of graduated rising temperatures to a natural mass of foliated, fibrous, or interlocked foliated or fibrous silicate of magnesia.

11. A refractory article of manufacture produced by the application of a succession of graduated rising temperatures to a natural mass of foliated, fibrous, or interlocked foliated or fibrous talc.

In testimony whereof I have signed my name to this specification, in the presence of two subscribing witnesses, this 1st day of August, 1902.

STEPHEN L. MERSHON.

Witnesses:
D. T. MERSHON,
M. PARKER.